V. A. FYNN.
ALTERNATING CURRENT MOTOR.
APPLICATION FILED JAN. 26, 1914.

1,122,491.

Patented Dec. 29, 1914.

WITNESSES:

Chas. A. Becker
G. M. Thorr

INVENTOR
Valère A. Fynn,

BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,122,491. Specification of Letters Patent. Patented Dec. 29, 1914.

Application filed January 26, 1914. Serial No. 814,310.

*To all whom it may concern:*

Be it known that I, VALÈRE ALFRED FYNN, a subject of the King of England, residing at St. Louis, Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to improvements in the class of induction motors in which the inducing or primary member is designed to produce more than one set of poles at starting.

It is the object of my invention to produce a motor of this class in which the use of moving contacts and normally idle windings or resistances on the rotor may be avoided, thus more fully utilizing the winding space on the rotor under running conditions, and to avoid the use of a starting transformer and of all complicated switching operations for re-organizing the stator connections after the motor has been brought up to speed.

My improved motor comprises a rotor carrying a high resistance squirrel cage winding and a low resistance P pole winding which is permanently short-circuited so as to respond to a P pole magnetization. The high resistance squirrel cage will, of course, respond to a magnetization of any number of poles. The stator carries a main P pole winding and an N pole starting winding. These two stator windings are connected in series at starting and, after the motor has reached a sufficient speed, the N pole winding is short-circuited. It will be understood that each stator winding may have any desired number of poles, the designations "P" and "N" being used to indicate that the stator windings produce different numbers of poles.

Figure 1:
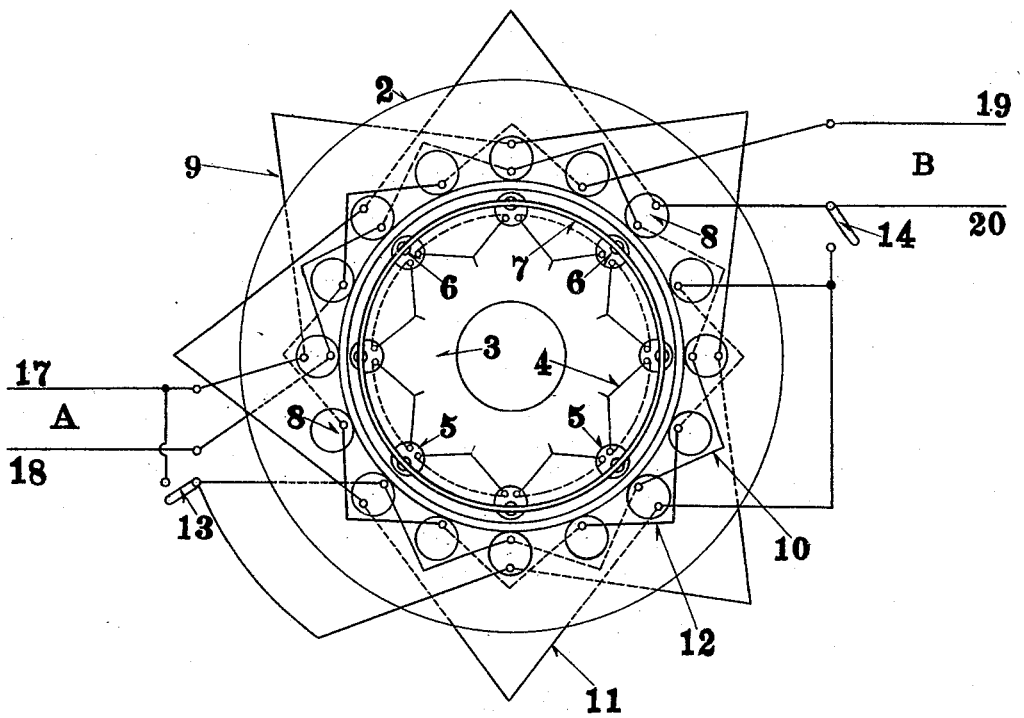
Figure 2:
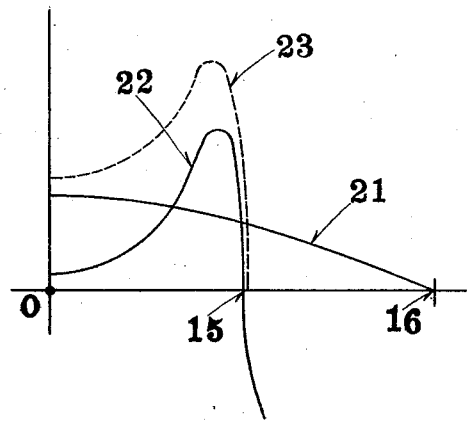

In the accompanying drawings, Figure 1 is a diagrammatic representation of a polyphase motor embodying my invention, and Fig. 2 is an explanatory diagram.

In Fig. 1, the stator 2 is provided with a number of holes or slots 8, in which the stator windings are located. The rotor 3 carries a number of slots 5 adapted to receive the rotor windings. The figure shows a two-phase motor, the stator of which is provided with a two-phase 8 pole and 4 pole winding. The 8 pole winding is the main stator winding. The 4 pole winding is the auxiliary, or starting, stator winding. The lead 17 of phase A is connected to one end of the 4 pole stator winding 9; the other end of this winding is permanently connected to one end of the 8 pole stator winding 10, the other end of 10 being connected to the lead 18 of phase A. The switch 13, pivoted at the junction of the windings 9 and 10, is adapted to short-circuit the 4 pole winding 9. Lead 19 of phase B is connected to one end of the 8 pole stator winding 12; the other end of this winding is permanently connected to one end of the 4 pole stator winding 11, the other end of 11 being permanently connected to lead 20 of phase B. The switch 14 is adapted to short-circuit the 4 pole winding 11. The rotor carries a high resistance squirrel cage, comprising a number of bars 6 connected at each end by a short-circuiting ring 7. A number of short-circuited coils 4 are also disposed in the rotor slots and span approximately one-eighth of the rotor circumference, so as to be inductively responsive to the 8 pole stator windings.

The operation of this machine is somewhat as follows: Assuming, for example, that the stator windings are connected to a two-phase supply, as shown in Fig. 1, and that the short-circuiting switches 13 and 14 are open, then the voltage of each phase will distribute itself between the 4 pole starting and the 8 pole working windings of each phase. The 8 pole windings of the two phases produce a rotary 8 pole field, which induces currents in both rotor windings. The auxiliary 4 pole windings of the two phases produce a rotary 4 pole field, which induces currents in the rotor squirrel cage only. The resistance of the squirrel cage is chosen higher than that of the 8 pole rotor winding, the resistance of which is made very low. If the main and auxiliary stator windings have the same number of turns, then, with the rotor at rest, it will require a very much greater voltage to force a given current through the auxiliary than through the main stator winding. If, having the same number of turns, these two windings are connected in series across a given voltage, thus being forced to carry the same current, then almost all of the available voltage will be expended in driving the current through the auxiliary winding. The difference of potential across this auxiliary winding will be large, that across the main winding very small, with the result that a very strong 4 pole and an extremely weak 8 pole flux will be produced.

I prefer to wind the auxiliary with fewer turns than the main winding and thus reduce this excessive difference between the two fluxes while still keeping the 4 pole greater than the 8 pole flux at starting. The small 8 pole flux will, nevertheless, induce a large current in the low resistance 8 pole rotor winding. Because of the large time constant of this rotor winding, the current therein will lag greatly behind the inducing flux and but a small torque will result. This small 8 pole flux will induce but a small current in the high resistance squirrel cage and, although this current will be nearly in phase with the inducing flux because of the small time constant of this rotor winding, yet the resulting torque will be small because of the small current. The larger 4 pole flux will induce a large and nearly cophasal current in the squirrel cage, thus producing a powerful starting torque. As the speed of the machine increases, the conditions will change somewhat, as shown in Fig. 2. The 4 pole torque 21 will diminish with increasing speed while the 8 pole torque 22 will rapidly increase with increasing speed until a nearly synchronous 8 pole speed is reached, when that torque will decrease extremely rapidly and become zero at the moment when the 8 pole synchronous speed is actually reached (point 15 of Fig. 2). At that instant, the 4 pole torque still has an appreciable value for it does not become zero until the 4 pole synchronous speed, point 16 of Fig. 2, is reached. This 4 pole synchronous speed is, of course, twice as great as the 8 pole synchronous speed, but it can never be reached by a well designed motor of this kind, because, as soon as the 8 pole synchronous speed is exceeded, the 8 pole rotor winding acts as a powerful brake, developing a negative torque, as approximately indicated in Fig. 2 by that part of the torque line which is shown below the horizontal axis. This negative 8 pole torque will prevent the motor shown in Fig. 1 from materially exceeding the 8 pole synchronous speed. The resultant torque 13 of said motor will, at every instant, be the arithmetical sum of the 4 pole and 8 pole torques. After the rotor has reached a sufficient speed, the switches 13 and 14 should be closed, either by hand or automatically, thus short-circuiting the auxiliary stator windings 9, 11, when the motor will continue to operate as an ordinary 8 pole machine. These 4 pole windings may be safely short-circuited, because they are not inductively responsive to the main 8 pole windings. The rotor windings will be fully utilized in normal operation, because the main rotor winding is an 8 pole winding and the auxiliary rotor winding is a squirrel cage which, of course, is responsive to an 8 pole induction. The auxiliary stator winding will be idle in normal operation unless means are provided for reconnecting same so as to produce an 8 pole magnetization. Such means would, however, form an unwelcome complication and are best dispensed with.

The starting stator windings may be designed to produce a greater number of poles than the main stator windings, and it is not necessary for one of these windings to have double the number of poles of the other. It is sufficient that the two numbers of poles be so chosen as to avoid effective induction between the two sets of windings.

Having fully described my invention, what I claim as new and desire to secure by Letters-Patent of the United States is:

1. In an induction motor, an inducing member provided with a P pole winding and an N pole winding, said windings being connected in series, an induced member provided with a high resistance squirrel cage winding and a low resistance short-circuited P pole winding, and means for short-circuiting the N pole inducing winding.

2. In an induction motor, an inducing member provided with a P pole winding and an N pole winding, an induced member provided with a high resistance squirrel cage winding and a low resistance short-circuited P pole winding, and means for short-circuiting the N pole inducing winding.

3. In an induction motor, an inducing member provided with a P pole winding and an N pole winding, said windings being connected in series, and an induced member provided with a high resistance squirrel cage winding and a low resistance short-circuited P pole winding.

4. In an induction motor, an inducing member provided with means for producing simultaneously an N pole and a P pole magnetization, an induced member affording a low resistance path for currents induced by one set of poles of the inducing member and a high resistance path for currents induced by both sets of poles of the inducing member.

In testimony whereof, I have hereunto set my hand and affixed my seal.

VALÈRE A. FYNN. [L. S.]

Witnesses:
  EMILY W. HENERMAN,
  C. HEINER.